United States Patent [19]
Marinaro

[11] Patent Number: 5,365,547
[45] Date of Patent: Nov. 15, 1994

[54] 1X ASYNCHRONOUS DATA SAMPLING CLOCK FOR PLUS MINUS TOPOLOGY APPLICATIONS

[76] Inventor: Frank Marinaro, 22 Lauren Ave., Dix Hills, N.Y. 11746

[21] Appl. No.: 914,898

[22] Filed: Jul. 16, 1992

Related U.S. Application Data

[63] Continuation-in-part of Ser. No. 750,968, Aug. 28, 1991.

[51] Int. Cl.$^5$ ............................................. H04L 27/00
[52] U.S. Cl. ...................................... 375/37; 375/106; 327/291
[58] Field of Search ............... 375/106, 110, 114, 116, 375/118, 37, 56; 370/100.1, 108; 340/825.2; 328/63, 72; 307/480, 269

[56] References Cited

U.S. PATENT DOCUMENTS

| | | | |
|---|---|---|---|
| 4,118,686 | 10/1978 | Lender | 375/19 |
| 4,481,640 | 11/1984 | Chow et al. | 375/56 |
| 4,539,533 | 9/1985 | French | 375/64 |

*Primary Examiner*—Stephen Chin
*Assistant Examiner*—Hai H. Phan
*Attorney, Agent, or Firm*—Dilworth & Barrese

[57] ABSTRACT

The present invention relates to a system for asynchronous transmission and reception of data between control units. The system includes a first control unit which is operatively connected to a first asynchronous transmitter-receiver circuit, a second control unit operatively connected to a second asynchronous transmitter-receiver circuit and a single media connected between the first and second control units, which facilitates serial communication of data therebetween. Each asynchronous transmitter receiver circuit includes a transmitter portion having circuit for separately processing odd data bits and even data bits at a rate between 1 MHz and 40 MHz, and a receiver portion for processing received data signals and extracting the odd and even data bits therefrom. The receiver portion has a data sampling clock circuit which includes a received data-to-clock position circuit for determining the position of the received data signals, and circuit for determining a true center of the received data signals and for selecting a proper sampling clock for the received data signals. The system also includes an interface portion for serially transmitting the odd and even data bits on a single media in response to the transmitter portion and for receiving serial data from the single media and detecting positive and negative transitions of the received data signals.

8 Claims, 9 Drawing Sheets

| TRANSMITTED DATA EIGHT BIT DATA BYTE | SYNC | SYNC | TD1 | TD2 | TD3 | TD4 | TD5 | TD6 | TD7 | TD8 | STOP | STOP |
|---|---|---|---|---|---|---|---|---|---|---|---|---|
| TRANSMITTED DATA IN BINARY | 1 | 1 | 1 | 1 | 0 | 1 | 0 | 0 | 1 | 0 | 0 | 0 |

TRANSMISSION DATA WAVEFORM

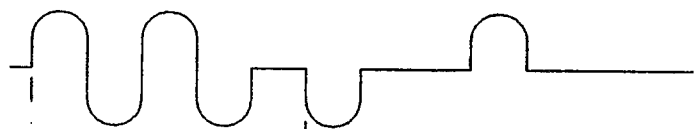

OUTPUT OF THE POSITIVE THRESHOLD DETECTOR

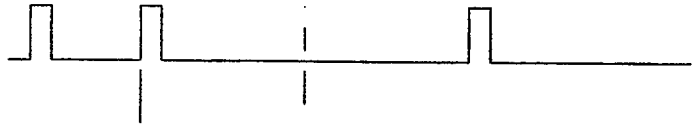

OUTPUT OF ODD PULSE EXPANSION CIRCUIT

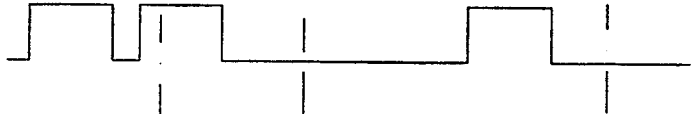

1X ASYNCHRONOUS DATA SAMPLING CLOCK

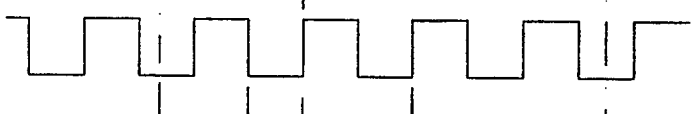

OUTPUT OF THE NEGATIVE THRESHOLD DETECTOR

OUTPUT OF EVEN PULSE EXPANSION CIRCUIT

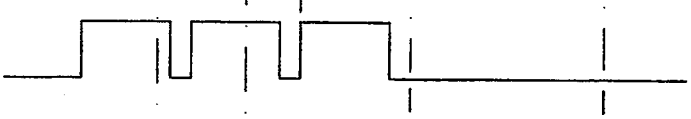

INVERSE 1X ASYCHRONOUS DATA SAMPLING CLOCK

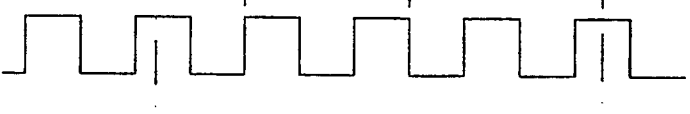

OUTPUT OF THE ENABLING CIRCUIT

FIG. 5

1X ASYNCHRONOUS DATA SAMPLING CLOCK FOR PLUS MINUS TOPOLOGY APPLICATIONS

CROSS-REFERENCE TO RELATED APPLICATIONS

This patent application is a continuation-in-part of copending application Ser. No. 07/750,968, filed Aug. 28, 1991.

BACKGROUND OF THE INVENTION

1. Field Of the Invention

The present invention relates to a system which modifies asynchronous data for high speed transmission along media. More particularly, this invention is intended for use in local area networks or wherever it is necessary to sample and retime asynchronous data.

2. Discussion of the Prior Art

Local area networks which permit digital data communications between personal computers, printers and similar data stations, are commonly used in offices, factories and other locations. These networks allow digital data communications, typically over coaxial cable or twisted pairs of transmission lines, between different computers and associated peripheral work stations at spaced locations within the office or factory facility.

The two most popular methods of transmitting and receiving data in local area networks in use today are the asynchronous method and the synchronous method. The most common asynchronous method is known as the Universal Asynchronous Receiver/Transmitter circuit (UART), while the most popular synchronous method utilizes Manchester Encoded transmitted data and Phase-Lock Loop (PLL) circuits. A disadvantage associated with these two methods is their respective limitations at high frequency data rates.

A UART circuit converts data from a parallel format to a serial format for transmission over a communications line. The UART requires clock frequencies of sixteen times that of the data rate. The method used by the UART to sample the Received Data (RD) using clock frequencies 16 times higher than the data bit rate is this: when the RD changes from a Mark to a Space (a Mark being a high and a Space being a low), a spike detection circuit in the UART counts eight clocks of the 16X clocks (one-half a bit time), then samples the data again to determine if the line is still in the low state. If the RD is still low the bit is considered a valid Start bit. This condition enables a counter in the UART which divides the 16X clock by 16 to produce a sampling clock at the center of each bit time.

The received data bits, the Mark and Space, are also known as Stop and Start bits respectively. A data word consists of one Start bit, five to eight character bits, one parity bit and one, or one and a half, Stop Bits. The UART is seldom used at frequencies above 1 MHz which is due to the high frequency system clock requirement of the 16X clocks. A UART designed with this philosophy would require a 16X clock frequency of 320 MHz to transfer data at a 20 MHz data rate.

The synchronous method, on the other hand, requires a forced mid-bit transition to convey the inherent timing information of the data. In the synchronous method, the clock defines the transmission time for the data, such that the frequency of the data be equal to that of the transmitter clock. Start and Stop bits for each character are not needed in the synchronous system, providing greater transmission band width for message bits.

At the present time the most popular commercially available asynchronous serial single line local area network operating at frequencies above 2 Mbits/second is manufactured and sold by Datapoint Corporation under the trademark ARCNET. Existing ARCNET Topology permits data transfer rates of 2.5 Mbits/second, wherein data is transmitted within a 400 nanosecond time interval on a 5 Mhz sine wave followed by a 200 nanosecond silent period. Recently, improvements of the ARCNET topology have resulted in a local area network having a transmission frequency of 20 Mbits/second. This topology is also manufactured and sold by Datapoint Corporation and is known as Arcnetplus. According to Datapoint this substantial improvement was made possible by a more efficient use of the 400 nanosecond interval during which time data bits are transmitted. This more efficient use of the 400 nanosecond time interval is accomplished adopting a combination of amplitude and phase modulation. With the use of high speed digital to analog convertors each encoded 4 bits/baud on the 5 Mhz carrier is assigned a voltage and a phase. There are eight distinct voltages and two distinct phases of this 5 Mhz carrier to combine for a weight of eight digital data bits for a 400 nanosecond transmission period. By eliminating the silent duration and maintaining the 5 Mhz carrier, Arcnetplus Topology can transmit data at the 2.5 Mbits/second to Arcnet nodes or 20 Mbit/s to Arcnetplus nodes. However high speed digital to analog converters are not very cost effective at the present time.

SUMMARY OF THE INVENTION

The present invention relates to an asynchronous transmitter-receiver circuit for use in local area networks which comprises a transmitter portion having means for separately processing odd data bits and even data bits at a rate of between about 1 MHz and about 40 MHz; a receiver portion for processing received data signals and extracting the odd and even data bits therefrom, said receiver portion having a data sampling clock circuit which includes a received data-to-clock position circuit and means for determining a true center of said received data and selecting a proper sampling clock for said received data; and an interface portion for serially transmitting said odd and even data bits on a single media in response to said transmitter portion and for receiving serial data from said single media and detecting positive and negative transitions of said received data signals.

The present invention also relates to a system and method of use of the above asynchronous transmitter-receiver circuit between a plurality of control units, e.g., computers, printers and the like.

BRIEF DESCRIPTION OF THE DRAWINGS

The features of the present invention may be better understood and further advantages and uses thereof more readily apparent, when considered in view of the following detailed description of the preferred embodiments, taken with the accompanying drawings in which:

FIG. 5 is a timing diagram of an exemplary plus-minus data scheme for encoding one eight bit data word contained within a twelve bit data byte word and illustrating the output of the received data pulse expansion circuit and the 1X asynchronous data sampling clock;

THEORY OF OPERATION

Figure 1:
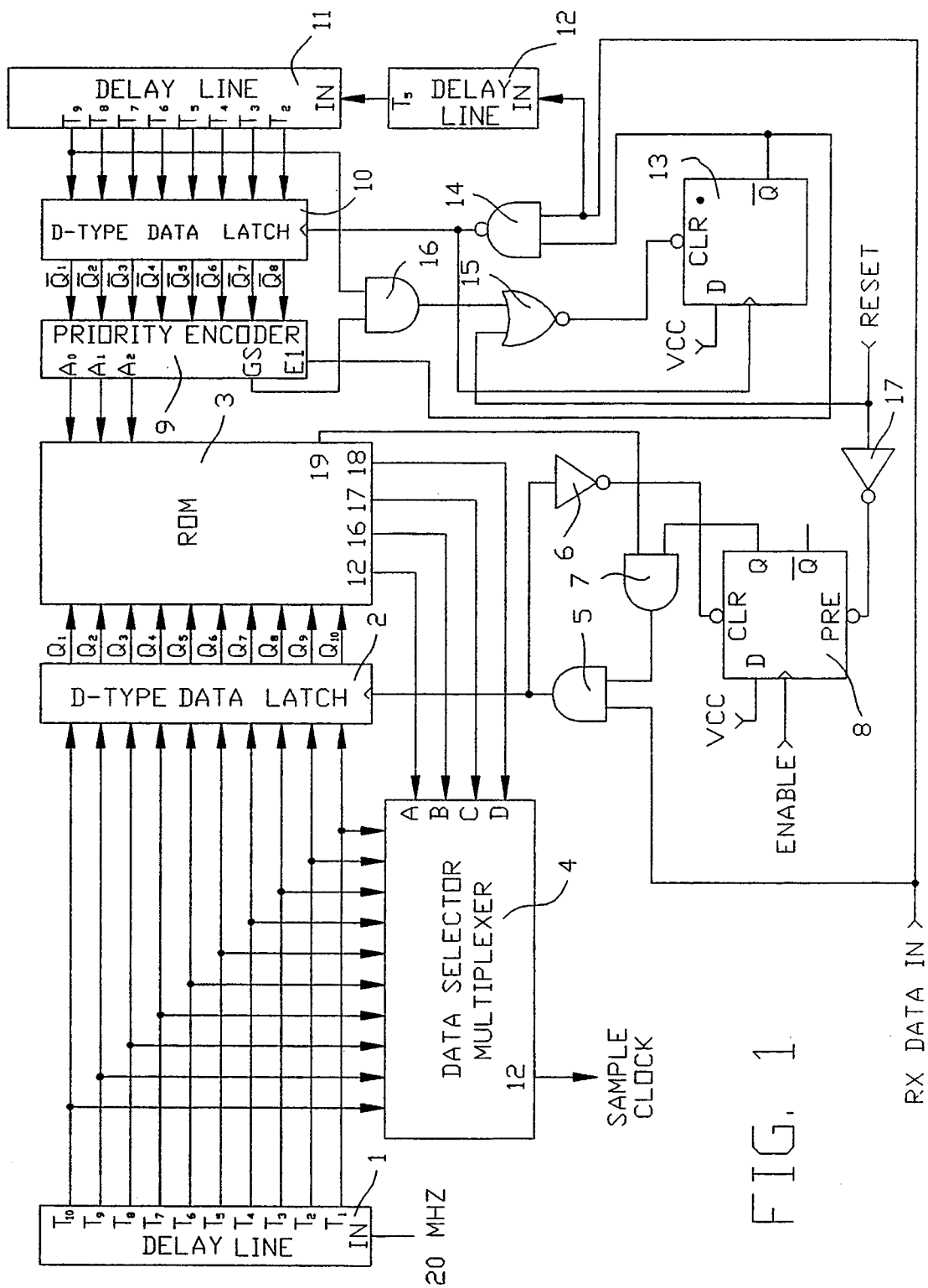
FIG. 1 is a schematic diagram of one embodiment the 1X asynchronous data sampling clock of the present invention.

The 1X asynchronous data sampling clock utilized with the plus-minus UART network of the present invention is based on the theory that two perfect oscillators operating at exactly the same frequency will maintain the same phase relationship to each other forever. Since it is not possible to design a perfect oscillator, for purposes of discussion, two oscillators operating at approximately the same frequency with an error of + or −0.01% shall be considered. By knowing the maximum error between the two oscillator frequencies, it is possible to calculate the maximum clock edge drift with respect to one another for a given time period.

Considering two 20 MHz oscillators that each have a frequency tolerance of + or −0.01%, the worst case frequency difference between the two oscillators would be for one oscillator to be at the maximum frequency of 20,020,000 HZ and the other to be at the minimum frequency of 19,980,000 HZ. To find the period difference it is necessary to first solve the period time.

$$T = 1/f, \text{ where } T = \text{time and } f = \text{frequency}$$

$$T = 1/f = (1/19,980,000) = 50.050 \text{ nano seconds}$$
$$(1/20,020,000) = \underline{49.950} \text{ nano seconds}$$
$$100 \text{ pico seconds}$$

The clock period error in such a scenario is equal to 100 pico seconds, which means the leading edge of the two clocks would drift 100 pico seconds with respect to each other for every clock period. One 20 MHz clock period is equal to 50 nano seconds. Dividing the period by the error (50 nsec/0.1 nsec=500), reveals that the two clocks will be coincident once for every 500 clock times.

As a second example, two 20 MHz oscillators with a frequency error of + or −0.005% will have a frequency difference of 20,010,000 HZ for the maximum frequency and 19,990,000 HZ for the minimum frequency. To find error in time.

$$T = 1/f = (1/19,990,000) = 50.025 \text{ nano seconds}$$
$$(1/20,010,000) = \underline{49.975} \text{ nano seconds}$$
$$50 \text{ pico seconds}$$

The clock period error between the two oscillators would be 50 pico seconds, and dividing the period by the error (50 ns/0.05 ns=1,000), for the same 50 nano second clock period the two oscillators will be coincident once every 1,000 clock times.

Figure 2:
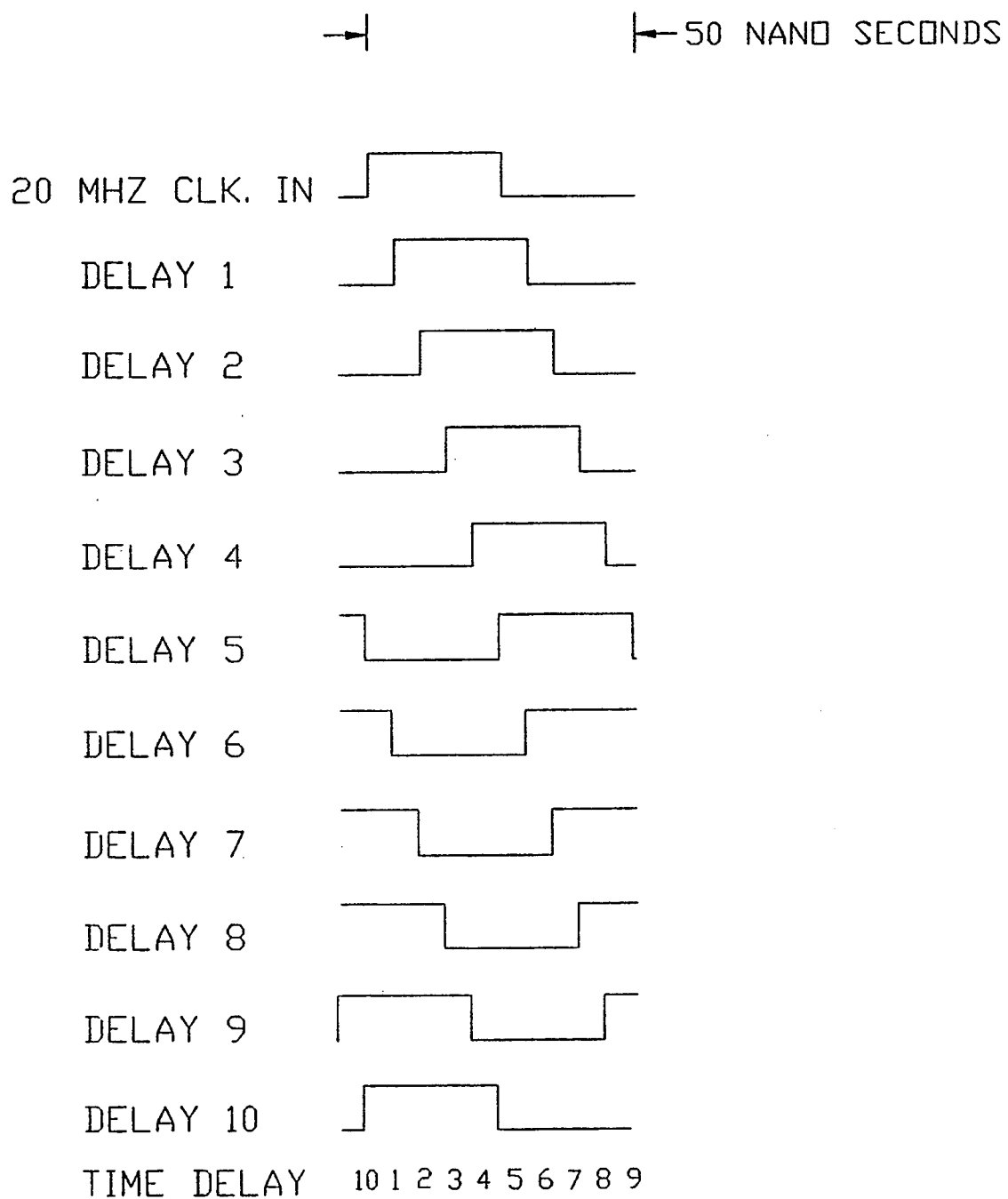
FIG. 2 is a timing diagram of the outputs of a ten tap 50 nano second delay line, with each tap delayed 5 nano seconds from the preceding tap.

Consider a 20 MHz clock as the input to a 50 nano second ten tap delay line. Each tap is delayed 5 nano seconds from the preceding tap. Since the total delay of the delay line is equal to one full 20 MHz clock time, the resulting outputs would provide a clock edge every 5 nano seconds during the clock period to chose from. Turning to the drawings, FIG. 2 is a diagram of this 50 nano second delay line output timing. If the outputs of this delay line were connected to the inputs of a D-Type data latch, which outputs at 1 times the input value, and this D-Type data latch was clocked, the position of each delayed output at the time that clock edge occurred would be latched. If this data latch clock were the leading edge of the received data (RD) the position of each delayed clock at the time that leading edge of RD occurred could be determined. If the delay line outputs were also connected to the data inputs of a data selector multiplexer, the clocks could then be selected that are phase shifted from the input clock in 36 degree increments, or every 5 nano seconds.

As previously mentioned, prior art UART circuits synchronize to the leading edge of the RD and sample the RD at the eight count of the divide by 16 clock, and at low frequencies this practice is acceptable. However, at high frequencies, such as of 20 MHz, a 15 nano second error in the data pulse band width is equivalent to a 30% bias distortion, whereas at a frequency of 1 MHz the same 15 nano seconds equals a bias distortion error of only 1.5%. With this in mind, one more item must be considered before an acceptable design of an asynchronous data sampling clock circuit for use at higher frequencies can be achieved, and that is the RD duty cycle or bias distortion.

When data is transmitted as a zero/one pattern it will appear as a 50% duty cycle at the transmitter end, however, it may not appear as a 50% duty cycle at the receiver end. This is due to the capacitance, inductance and resistance of the interconnecting cables, and is called bias distortion. For 20 MHz data which has a 50 nano second bit time the allowable bias distortion is 30%, or 35 nano seconds for a minimum pulse width and 65 nano seconds for the maximum pulse width. This makes it necessary to incorporate a bias distortion sampling circuit in the RD (received data) sampling clock circuit design, to determine where the true center of the RD pulse is.

The 1X asynchronous data sampling clock utilizes a delay line and a D-type data latch concept. In this case the RD (received data) signal is connected to the input of a 75 nano second 15 tap delay line, with each tap delayed 5 nano seconds from the preceding tap. When the input data changes from a zero to a one, this signal will propagate through the delay line. The trailing edge of this RD (received data) signal will become the clock to the D-Type data latch loading this D-Type data latch with the position of the received data in the delay line, which is how far the RD had propagated through the delay line at the time its trailing edge occurred. From this latch the received data pulse width can be determined.

If the outputs of the two data latches are decoded the RD pulse width information in one data latch and the clock to RD leading edge position information in the other data latch can be determined. This information can be used as the address inputs to a ROM that is programmed to output to the address inputs of the data selector multiplexer. This program can be designed to select the proper delayed clock, derived from the previously mentioned data selector multiplexer delayed clock data inputs that will coincide with the center of the incoming received data. The multiplexer output could then be used as the RD sampling clock.

Figure 3:
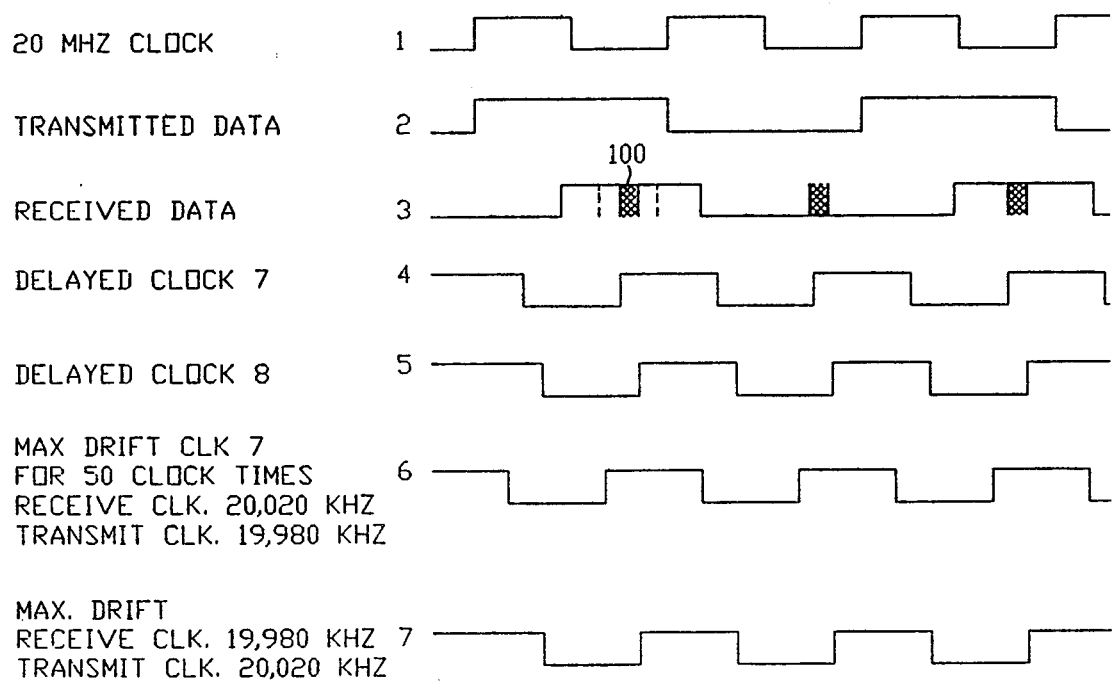
FIG. 3 is a timing diagram illustrating the data sampling window for receiving data.

Referring now to FIG. 2 and FIG. 3, and ignoring any component internal delays, the sampling clock selection and the safe sampling window will now be described. FIG. 3 line 2 shows a one-zero-one data pattern having a 50% duty cycle as the transmitted data while line 3 of FIG. 3 is an illustration of the worse case RD duty cycle. Shaded portion 100 of this RD on line 3 of FIG. 3 represents the error that can be introduced by the delay line and D-Type latch circuit. Since the taps are spaced 5 nano seconds apart an error of 5 nano seconds is produced. Lines 4 and 5 of FIG. 3 are the two clocks that can be chosen to sample the RD for this particular illustration. Referring to FIG. 2 and FIG. 3, particularly lines 4 and 5 of FIG. 3, are the delayed clocks 7 and 8 of FIG. 2, respectively. Line 6 of FIG. 3 illustrates the position to which the clock on line 4 of FIG. 3 would drift in 50 clock cycles, if the transmit clock frequency is 19,980,000 HZ and the receiver clock frequency is 20,020,000 HZ. The illustration on line 7 of FIG. 3 shows the position to which the clock on line 4 would drift in 50 clock times if the transmit clock frequency is 20,020,000 HZ and the receiver clock frequency is 19,980,000 HZ.

Assuming total component internal delays of 12 nano seconds, the ROM would have been programmed to compensate for the component internal delays and would select delayed clock 5 of FIG. 2 as the RD (received data) sample clock.

DESCRIPTION OF THE PREFERRED EMBODIMENT

The description of the preferred embodiment of the 1X asynchronous data sampling clock of the present invention applies to a 20 MHz data rate design; higher or lower frequency versions of the invention can be designed using this description as a guide. For this description the Stop bit will be considered to be a logic zero or low signal and the Start bit will be a logic one or high signal.

When the system is initially powered up and at the end of every data packet, a reset pulse of no less than 25 nano seconds is sent to the retiming circuit logic. Referring to FIG. 1 this reset pulse is connected to the input pin of the invertor 17 and input pin of the NOR gate 15. This reset pulse will cause the following chain of events to occur: When the reset pulse changes from a low to a high the input pin of NOR gate 15 will go high causing its output pin to go low. This low output on the output pin of NOR gate 15 is connected to the clear input pin of the D-Type Flip-Flop 13, causing its $\overline{Q}$ output pin to be a logic one. The ($\overline{Q}$ output pin of Flip-Flop 13 is connected to the input pin E1 of the Priority Encoder 9. A logic one on the E1 input of encoder 9 will cause the A0, A1, A2 and GS outputs of encoder 9 to be disable (all outputs will appear as high or a logic one). The A0–A2 outputs of encoder 9 are connected to a Read Only Memory (ROM) 3. Whenever the A0–A2 outputs of encoder 9 are all high ROM 3 is programmed to output a zero on pin 19. This zero at pin 19 of ROM 3 prevents the RD leading edge detect circuit from clocking the D-Type Data Latch 2 via AND gate 5. This is accomplished in the following manner. The input pin of AND gate 7 is connected to the output pin 19 of ROM 3 which as stated is low. The input pin of AND gate 7 will also be low, therefor the output pin of AND gate 7 must also be a logic zero. This output pin of AND gate 7 is connected to the input pin of AND gate 5, and this low input on the input pin of AND gate 5 will cause its output pin to be a logic zero, disabling AND gate 5.

The Reset pulse will also preset the D-Type Flip-Flop 8 in this manner: the input pin of invertor 17 will go high causing its output pin to go low. This low output on the output pin of invertor 17 is connected to the preset input pin of the D-Type Flip-Flop 8 and will preset this flip-flop causing the Q output pin of flip-flop 8 to be a logic one. This Q output pin of flip-flop 8 is connected to the input pin of AND gate 7.

The sampling clock circuit is now reset and in the search mode searching for the start of transmission on the RD line. The 20 MHz system clock is connected to the input of delay line 1 as seen in FIG. 1, and it will propagate through the 50 nano second ten tap delay line 1. Each tap of this delay line 1 is delayed 5 nano seconds from the previous tap. When the RD signal has a low to high transition the RD will change from a logic zero to a logic one. The RD is connected to the input pin of the 25 nano second delay line 12, the input pin of AND gate 5 and the input pin of NAND gate 14. Since the D-Type Flip-Flop 13 has been cleared by the reset pulse the $\overline{Q}$ output pin will be a logic one and is connected to input pin of NAND gate 14. The result of these two high inputs that appear on NAND gate 14 will cause its output pin to be a logic zero. The output pin of delay line 12 is connected to the input pin of the 50 nano second ten tap delay line 11. The total delay of the two delay lines 11 and 12 in series is 75 nano seconds with each tap being delayed 5 nano seconds from the preceding tap. Delay line 11 output pins are connected to the D inputs of the D-Type Data Latch 10. The delay line outputs that are connected to the D inputs of Data Latch 10 are equivalent to the 35 nano seconds through 70 nano seconds delays in 5 nano second increments of delay lines 11 and 12. The RD will propagate through the two delay lines 11 and 12, and when the RD returns to a logic zero at the end of its bit time the output pin of NAND gate 14 will change from a logic zero to a logic one clocking the D-Type Data Latch 10, latching the state of the delay line 11 at that time.

If the pulse width is less than 35 nano seconds it will not have propagated through delay line 12 to the T2 output of delay line 11 and data latch 10 will latch all zeros. Since it is the $\overline{Q}$ outputs of data latch 10 that are connected to the inputs of Priority Encoder 9 all the inputs of encoder 9 will be high.

If the RD pulse width is greater than b 65 nano seconds all the D inputs of data latch 10 will be high when the RD changes from a high to a low latching all highs into data latch 10 causing all the inputs of encoder 9 to be low.

If the pulse width is within the maximum bias distortion limits the signal will have propagated to somewhere between the T2 output and the T8 output of delay line 11. Since the Priority Encoder 9 responds only to the highest number priority the A0–A2 outputs will reflect the highest input number with a zero. More precisely the width of the RD bit can be determined by how far this signal has propagated through the delay lines when its trailing edge occurred.

The output pin of the NAND gate 14 will also clock the D-Type Flip-Flop 13; since the D input pin is high, the $\overline{Q}$ output pin will change to a logic zero. This $\overline{Q}$ output is connected to input pin of NAND gate 14 and this zero will cause the output pin of the NAND gate 14 to remain high thereby disabling the NAND gate from producing any additional clocks. The $\overline{Q}$ output pin of flip-flop 13 is also connected to the E1 input pin of Encoder 9, and when the E1 input pin of the Priority Encoder 9 changes to a logic zero this will enable the outputs of the Priority Encoder 9.

Thus, the inputs of the Priority Encoder 9 are connected to the e,ovs/Q/ outputs of the D-Type Data Latch 10 and if the RD is within the minimum and maximum pulse width the output pin 19 of ROM 3 will change to a logic one causing the output pin of the AND gate 7 to be a logic one. The output pin of AND gate 7 is connected to the input pin of AND gate 5 and this high will enable AND gate 5. The next low to high transition of the RD will cause the output pin of AND gate 5 to become logic one responding to the RD at its input pin. The output pin of AND gate 5 is connected to the clock input pin 13 of the D-Type Data Latch 2 and this low to high transition will latch the state of the outputs of delay line 1 into the D-Type Data Latch 2, to identify where each delayed clock is with respect to the RD leading edge.

This high on the output pin of AND gate 5 is also connected to the input of invertor 6 and will cause the invertor output pin to go low. This output pin of invertor 6 is connected to the clear input pin of the D-Type Flip-Flop 8 and a zero on this clear input pin will cause the flip-flop to clear. The Q output pin of flip-flop 8 will go low causing the output pin of AND gate 7 to go low, removing the high from the input pin of AND gate 5 disabling AND gate 5 and inhibiting any additional clocking of the D-Type Latch 2. The Q outputs of Latch 2 are connected to address inputs of ROM 3 together with the address inputs from the Priority Encoder 9.

ROM 3 output pins 12, 16, 17 and 18 are the address inputs of Data Selector Multiplexer 4. The ten delayed clocks from the outputs of delay line 1 are connected to the data inputs of multiplexer 4. ROM 3 has been programmed to compensate for circuit component propagation delays, knowing the data pulse width and where the leading edge of the data is with reference to the delayed clocks. ROM 3 outputs address the multiplexer 4 to select the delayed clock that corresponds to the center of the RD (received data). This output that appears at pin 12 of multiplexer 4 is the RD Sample Clock.

As stated in the theory above, the delayed clocks to the leading edge of RD will drift with respect to each other in time, and therefor an enable pulse of approximately 25 nano seconds must be sent to the clock input of the D-Type Flip-Flop 8 every word frame depending on signal conditions and data accuracy requirements. (A word frame is equal to eight to fifty one data bits). This enable clock will set the D-Type flip-flop 8 allowing the Q output to change to a logic one and as stated above this will cause the output of AND gate 7 to change to a logic one enabling AND gate 5 to clock the D-Type Latch 2 with the new RD to delayed clocks relationship with the next start bit.

If the RD returns to a logic zero prematurely, (in less than 35 nano seconds), the output pin of NAND gate 14 will clock the D-Type Data Latch 10 before the signal propagates to the T2 output of delay line 11 which would require 35 nano seconds of time to elapse. All the $\overline{Q}$ outputs of data latch 10 will be high causing the A0–A2 and the GS outputs of the Priority Encoder 9 to be high. With the GS output high and being connected to the input pin of AND gate 16, it will cause the output pin of the AND gate 16 to change to a logic one when the RD signal has propagated to the T9 output pin of delay line 11. The output pin of AND gate 16 is connected to the input pin of NOR gate 15 and a high on this input will cause the output pin of the NOR gate 15 to go low resetting the D-Type Flip-Flop 13.

If the signal on the RD line exceeds the maximum pulse width of 65 nano seconds it will propagate to the T9 output of delay line 11, which requires a minimum of 70 nano seconds before a high to low transition of the RD occurs. The GS output pin of Encoder 9 is high and is connected to input pin of AND gate 16. The signal at the T9 output pin of delay line 11 is connected to the input pin of AND gate 16. With both inputs high the output pin of the AND gate 16 will be high. The output pin of AND gate 16 is connected to input pin of NOR gate 15 and this high on NOR gate 15 input will cause its output pin to be low. This output pin of NOR gate 15 is connected to the clear input pin of flip-flop 13 and this low on the clear input will clear D-Type flip-flop 13. With the clear input of the D-Type Flip-Flop 13 low it will not respond to clocks from NAND gate 14 when the RD signal does go low. With the D-Type Flip-Flop 13 in the cleared or reset state the circuit logic will continue searching for valid RD.

The multitapped delay line of the present invention provides a plurality of clock positions from the one input clock. The UART spike detection circuit divides the 16X clock from the start of the RD to sample the center of the RD. The present invention utilizes a leading edge of the RD-to-clock position circuit, a bias distortion circuit and a means for combining and decoding the output signals of these circuits to determine the center of the RD so as to select the proper sampling clock for the RD.

Figure 4:
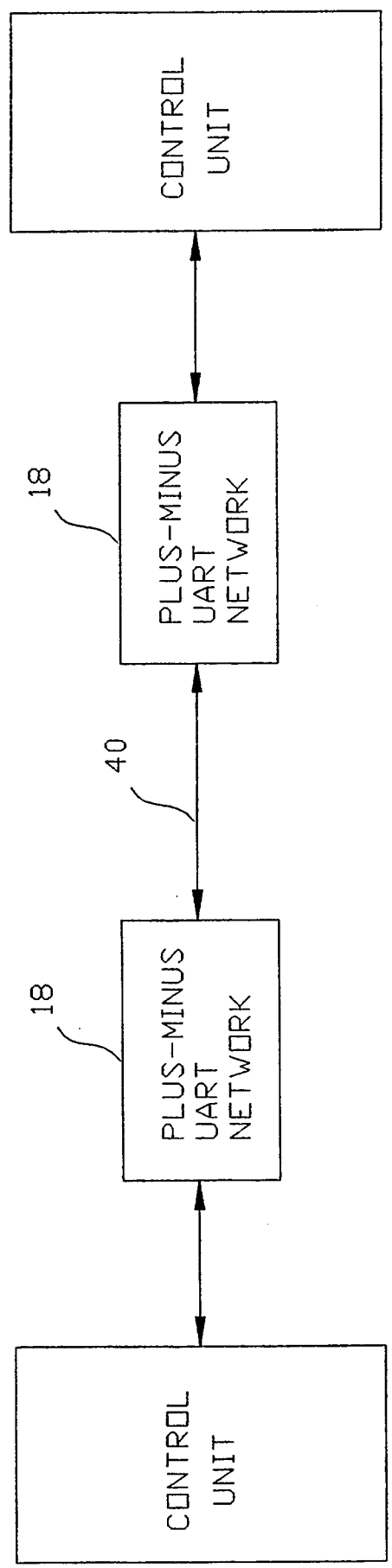
FIG. 4 is a system block diagram illustrating the plus-minus UART network of the present invention connected between control units.

The preferred plus-minus universal asynchronous receiver transmitter (UART) network 18 of the present invention will now be discussed with reference to FIGS. 4–9. As shown in FIG. 4, plus-minus UART network 18 of the present invention functions as an interface between separate control units (e.g., a plurality of computers or computers and peripheral devices) and provides a high speed data transmission network which is simple, inexpensive and permits the use of simple inexpensive medium attachment units 40 between the control units.

In the preferred embodiment, the plus-minus UART network includes a transmitter network, a receiver network and a driver/receiver interface. The transmitter network receives data from a control unit in parallel form and modifies the data to transmit it in serial form. Generally, the transmitter network, receiver network 61 and driver/receiver interface are utilized to implement data transmission rates between about 1 Mbits/second and about 40 Mbits/second. Preferably, as will be discussed hereinbelow, the data transmission rate is 40 Mbits/second. To achieve this transmission rate, it is preferred that advanced Schottky (or equivalent) devices are utilized.

Additionally, the plus-minus UART network of the present invention is intended to be used in an isochronous mode which contains an even number of bit times in each data byte word. This even bit method of transmitting data will produce a smooth clock transition from byte to byte at the receiver network. Because the 1X asynchronous data sampling clock frequency is, preferably, one half that of the transmitter waveform frequency, an odd number of data bit times in the data byte word would cause the 1X asynchronous data sampling clock circuit to select a delayed clock that may be one hundred and eighty degrees out of phase with the preceding sampling clock. As a result, unwanted transients may appear on the sampling clock during the sampling clock select time, where the sampling clock select time includes the time from the leading edge of the received data to the time the new clock is selected through the multiplexer of the 1X asynchronous data sampling clock circuit. In the isochronous mode, however, when an even number of bit times are used in the data byte word, the 1X asynchronous data sampling clock circuit will select a sampling clock of approximately plus or minus five nanoseconds from the preceding byte sampling clock, thus ensuring a stable clock during the sampling clock select time.

Generally, the positive transitions of the transmitted waveform are considered as odd logic one numbered data bits, (e.g., 1, 3, 5, and 7) and the negative transitions of the transmitted waveform are considered as even logic one numbered data bits (e.g., 2, 4, 6 and 8). Silent bits are as considered logic zero odd or even data bits. An example of a transmitted waveform having an eight bit data word is shown in FIG. 5, line 2. This exemplary waveform shows that when a logic one is to be transmitted the transmitted waveform will either go through an eight volt positive transition or an eight volt negative transition depending on the bit position of the logic one in the data word, that is, whether the bit position is odd or even. Whereas, transmission of a logic zero is equal to the absence of positive or negative transition. Although the exemplary waveform has an eight bit waveform, the number of bits in the data word can range from between eight bits and sixty-four bits.

Typically, data is transmitted in data byte words which include at least one sync bit, a data word and at least one stop bit. Preferably, a minimum data byte word contains two sync bits followed by a data word, followed by two stop bits. An illustration of a data byte word is shown in FIG. 5 lines 1 and 2, where line 1 illustrates the bit name and an exemplary data byte word, and line 2 illustrates the corresponding transmitted waveform.

Figure 6:
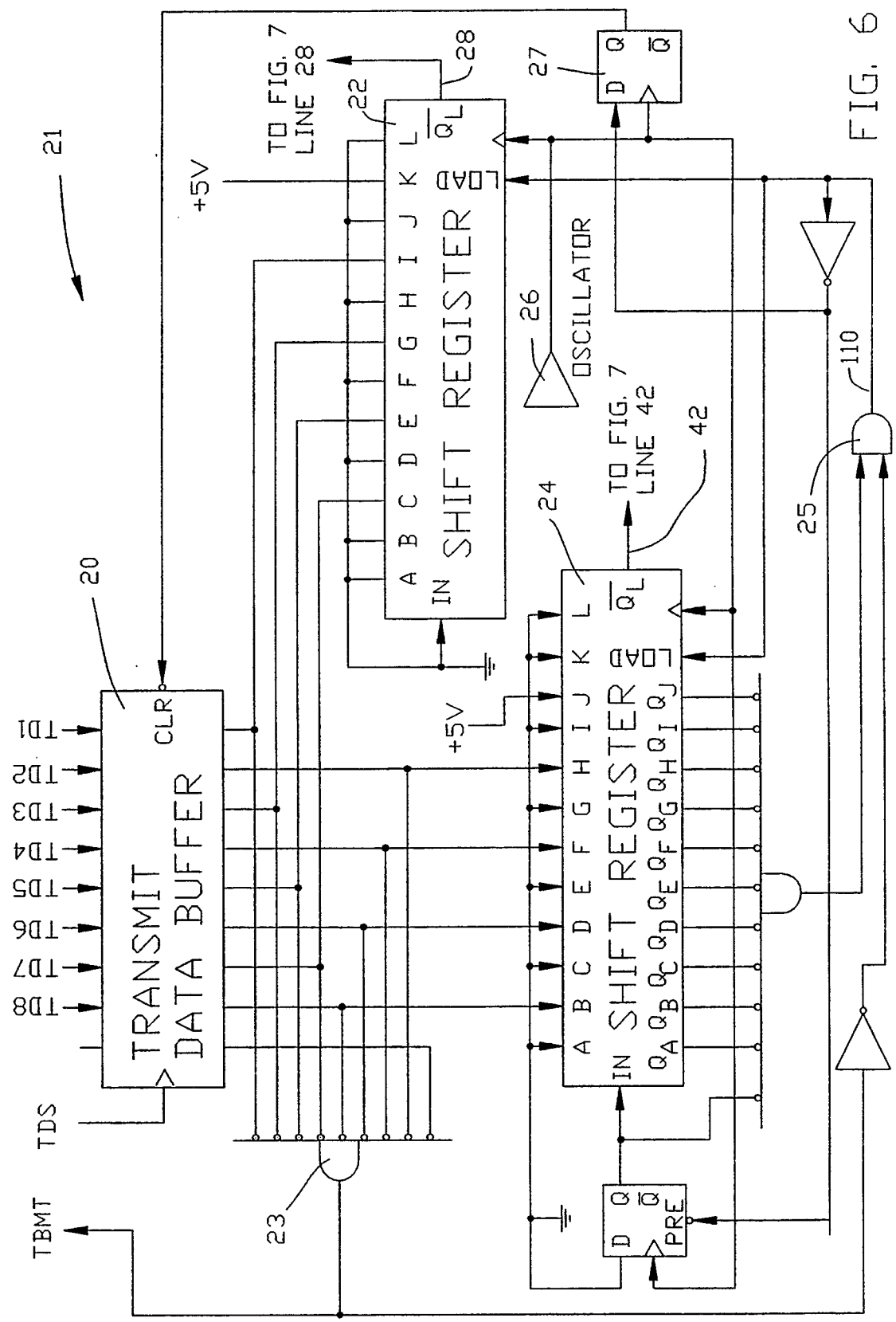
FIG. 6 is a schematic diagram of the plus-minus UART transmitter of the present invention.
Figure 7:
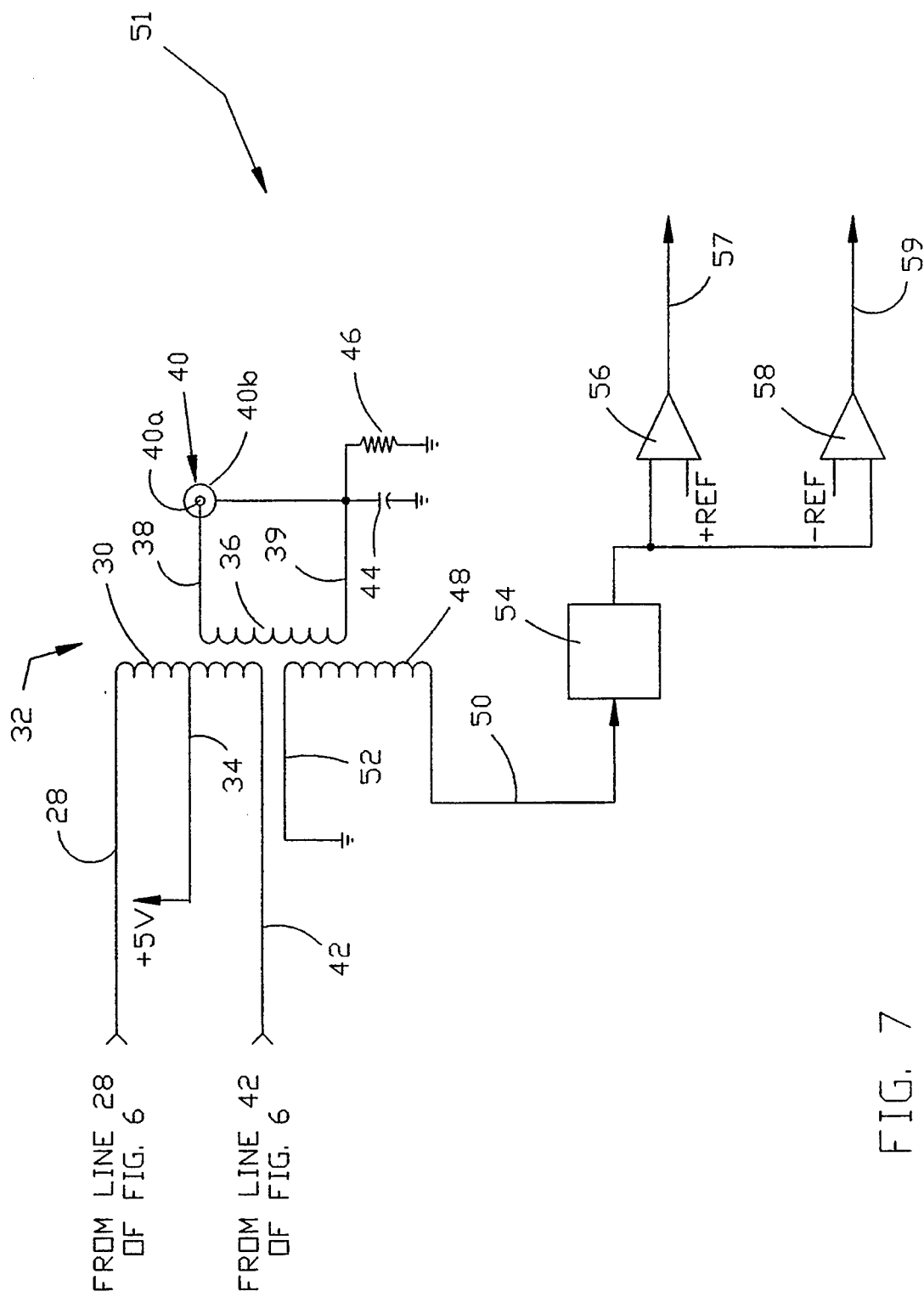
FIG. 7 is a schematic diagram of the driver/receiver interface for the plus-minus UART of the present invention.

Turning to FIGS. 6 and 7, data transmission utilizing transmitter network 21 and driver/receiver interface 51 will now be discussed. A low level on the transmit data strobe (TDS) of transmit data buffer 20 causes transmit data from user connect outputs of a control unit (not shown) to enter transmit data buffer 20 inputs TD1-TD8. When the two parallel-in serial-out shift registers 22 and 24 of transmitter network 21 are empty, transmit data buffer 20 will transfer the data on TD1, TD3, TD5, and TD7 data bits into the I, G, E, and C inputs of the positive pulse transmit parallel-in serial-out shift register 22. Data on the TD2, TD4, TD6, and TD8 data bits of transmit data buffer 20 will be transferred to the H, F, D, and B inputs of the negative pulse transmit parallel-in serial-out shift register 24. In the configuration shown in FIG. 6, when data is transferred from the transmit data buffer 20 into shift registers 22 and 24 the following events occur. AND gate 23 will set the transmit buffer empty (TBMT) flag to a logic one when cleared by the inversion of register load input signal 110 from gate 25 and flip-flop 27. The TBMT signal is monitored by a control unit (not shown) and is a request or invitation to load another eight bit data word from the user connect outputs into transmit data buffer 20 inputs (TD1-TD8). In addition, the two sync bits, the data word and the two stop bits are loaded into shift registers 22 and 24 utilizing the register load input signal 110. Preferably, the register load input signal is one bit in duration and occurs during the stop bit time.

Once the load signal is removed oscillator 26, preferably a 40 MHz oscillator, will clock shift registers 22 and 24 causing the data to exit shift registers 22 and 24 through their respective $\overline{Q}_L$ output. The $\overline{Q}_L$ output of shift register 22 is connected to lead 28 of pulse transformer 32, center tap 34 of winding 30 is connected to positive 5 volts and the $\overline{Q}_L$ output of shift register 24 is connected to lead 42 of pulse transformer 32, as shown in FIG. 7. Windings 30 and 36 of pulse transformer 32, are wound in such a manner that a low at the output of shift register 22, will cause the signal on lead 38 of winding 36 to change so that a positive voltage, preferably plus eight volts, will appear on inner conductor 40a of coaxial connector 40. Whereas, a logic one shifted through shift register 24, will cause the signal on lead 38 of winding 36 to change so that a negative voltage, preferably minus eight volts, will appear on inner conductor 40a of coaxial connector 40. The outer conductor or shield 40b of coaxial connecter 40 is connected to lead 39 of winding 18 and is connected to the electrical ground through capacitor 44 and resistor 46, as shown in FIG. 7. Because the transmit shift registers are preferably clocked at a 40 MHz clock rate, each data bit transition is 25 nanoseconds in duration and together with the inductance and capacitance of the circuit components will produce a 20 MHz signal as the transmitted waveform shown in FIG. 5, line 2.

Reception of data utilizing receiver network 61 and driver/receiver interface 51 will now be discussed with reference to FIGS. 7 and 8. During the receive mode, the received data waveform (i.e., the same waveform transmitted by transmitter network 21) is received by driver/receiver interface 51, via coaxial connector 40, and transferred to receiver network 61. Winding 36 of transformer 32, induces the waveform voltage from winding 36 to winding 48 of transformer 32 so that the induced waveform is in phase with the received data signal. Lead 50 of winding 48 is connected to bandpass filter 54 to remove any unwanted transients from the received data waveform, while lead 52 of winding 48 is connected to signal ground.

The output of bandpass filter 54 is connected to two threshold voltage detectors 56 and 58. Detector 56 is biased to detect the positive transitions of the bandpass filtered received data waveform, shown in FIG. 5, line 3, while detector 58 is biased to detect the negative transitions of the filtered received data waveform, as shown in FIG. 5, line 6. These plus and minus transitions represent the received data which corresponds to the transmitted data sent from another device connected utilizing a similar plus-minus UART network. However, the output of the threshold detectors may not be in an acceptable form to sample the received data with the 1X asynchronous data sampling clock of the present invention. To illustrate, the minimum acceptable pulse width of each data bit for reliable data sampling data is thirty five nanoseconds. However, the output pulse width from voltage detectors 56 and 58 may be as little threshold as 10 nanoseconds in duration, depending on the amplitude of the received data at the threshold voltage detector input. Therefore, a data bit expansion circuit may be utilized to expand the pulse width of the data bits to facilitate sampling by the 1X asynchronous data sampling clock.

Figure 8:
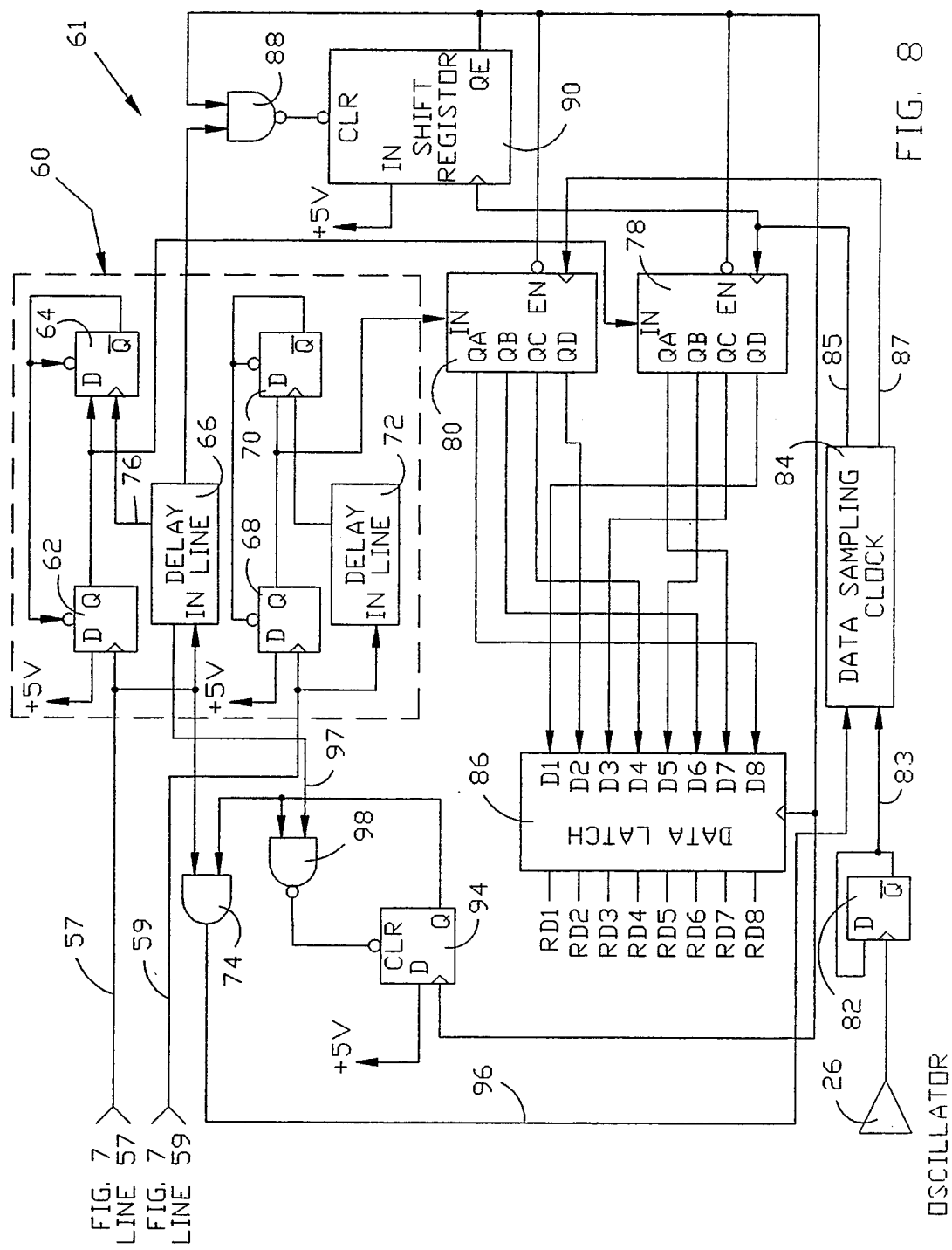
FIG. 8 is a schematic diagram of the plus-minus UART receiver of the present invention.

In the preferred embodiment, received data bit expansion circuit 60, shown in FIG. 8, includes a plus portion, which is comprised of D type flip-flops 62 and 64 and delay line 66, and a minus portion, which is comprised of D type flip-flops 68 and 70 and delay line 72. Both are configured to operate in a similar manner, except that the plus portion is utilized for odd bits of data and the minus portion is utilized for even bits of data. Expansion circuit 60 converts the received 40 MHz data waveform into two separate 20 MHz received data words. One half of the received data word contains the odd bits of the transmitted data word and the other half of the received data word contains the even bits of the transmitted data word.

Turning to the plus portion of data expansion circuit 60, the output of positive threshold detector 56 is connected to the clock input of D type flip-flop 62, the input of five tap fifty nanosecond delay line 66 and one input of two input AND gate 74, via line 57. The Q output of flip-flop 62 is connected to the D input of flip-flop 64, the D input of flip-flop 62 is connected to a logic one level and the Q output of flip-flop 64 is connected to the clear inputs of flip-flops 62 and 64. In this configuration, a positive transition of the filtered received data signal at the input of threshold voltage detector 56 will cause the Q output of flip-flop 62 to change from a logic zero to a logic one. Forty nanoseconds later a low to high transition will appear at the forty nanosecond delay output of delay line 66 which clocks flip-flop 64, thereby clearing flip-flops 62 and 64. As a result, the Q output of flip-flop 62 represents the expanded odd bits of the filtered received data waveform. i.e., the pulse width of each odd data bit is expanded to approximately forty nanoseconds, as shown in FIG. 5, line 4. The data is then transferred to the serial input of odd shift register 78.

As noted above, threshold detector 58, flip-flops 68 and 70 and delay line 72 are configured to function in the same manner for the minus portion as threshold detector 56, flip-flops 62 and 64, and delay line 66 operate for the plus portion. As a result, the output of flip-flop 68 represents the expanded even bits of the filtered received data waveform, i.e., the pulse width of each even bit of data is expanded to approximately forty nanoseconds, as shown in FIG. 5, line 7. The data is then transferred to the serial input of even shift register 80.

Continuing to refer to FIG. 8, flip-flop 82 is configured to divide the preferred 40 MHz frequency of oscillator (system clock) 26 by two so that the resulting output is a 20 MHz square wave clock. The 20 MHz output of flip-flop 82 is the clock input to 1X asynchronous data sampling clock circuit 84. The true clock output of data sampling clock 84 is connected to the clock input of odd shift register 78 via line 85 and the inverted clock output of data sampling clock 84 is connected to the clock input of even shift register 80 via line 87. As noted above, the received data bits are serially transferred into four bit serial-in parallel-out shift registers 78 and 80. Shift register 78 is used to store the odd received data bits and their position in the data word, and shift register 80 is used to store even received data bits and their position in the data word using data sampling clock 84. It should be noted that the sync bits are not stored but are removed from the data byte at this time, as will be discussed below.

When the eight bits of the received data word have been shifted into shift registers 78 and 80, the contents of the shift registers are transferred in parallel form and latched into data latch 86, as will be discussed in further detail below. The output of the odd bit shift register 78 is connected to the inputs of data latch 86 so that the QD, QC, QB, and QA outputs of shift register 78 are connected to the D1, D3, D5, and D7 inputs of data latch 86, respectively. In a similar manner the QD, QC, QB and QA outputs of even shift register 80 are connected to the D2, D4, D6 and D8 inputs of data latch 86, respectively.

The enable signal for shift registers 78 and 80 is produced by NAND gate 88 and shift register 90 in the following manner. The serial input of shift register 90 is connected to a logic one. As noted above, when the first positive transition (i.e., the sync bit) of the received data waveform is detected, it is propagated through delay line 66. The fifty nanosecond output tap 92 of delay line 66 is connected to one input of NAND gate 88 and the QE output of shift register 90 is connected to other input of NAND gate 88. As a result, when the QE output of shift register 90 changes to a logic zero, it prevents any future data bits propagating through delay line 66 from clearing shift register 90, as shown in FIG. 5, line 9. When the fifty nanosecond tap of delay line 66 and the QE output of shift register 90 are at logic one levels, shift register 90 will be cleared by the output of NAND gate 88. Clearing shift register 90 enables shift registers 78 and 80 via the QE output of shift register 90, as shown in FIG. 8. Enabling shift registers 78 and 80 after the fifty nanosecond delay prevents the sync bits from being shifted into shift registers 78 and 80.

The enabling circuitry is configured to allow four bits of data to be shifted through shift registers 78 and 80 before enabling the outputs thereof as noted above. The QE output of shift register 90 is also connected to the clock input of data latch 86 so that a low to high transition of the QE output will latch the received data into data latch 86. The parallel outputs of data latch 86 represents the complete received data word which is then transferred to a control unit via lines RD1–RD8.

Figure 9:
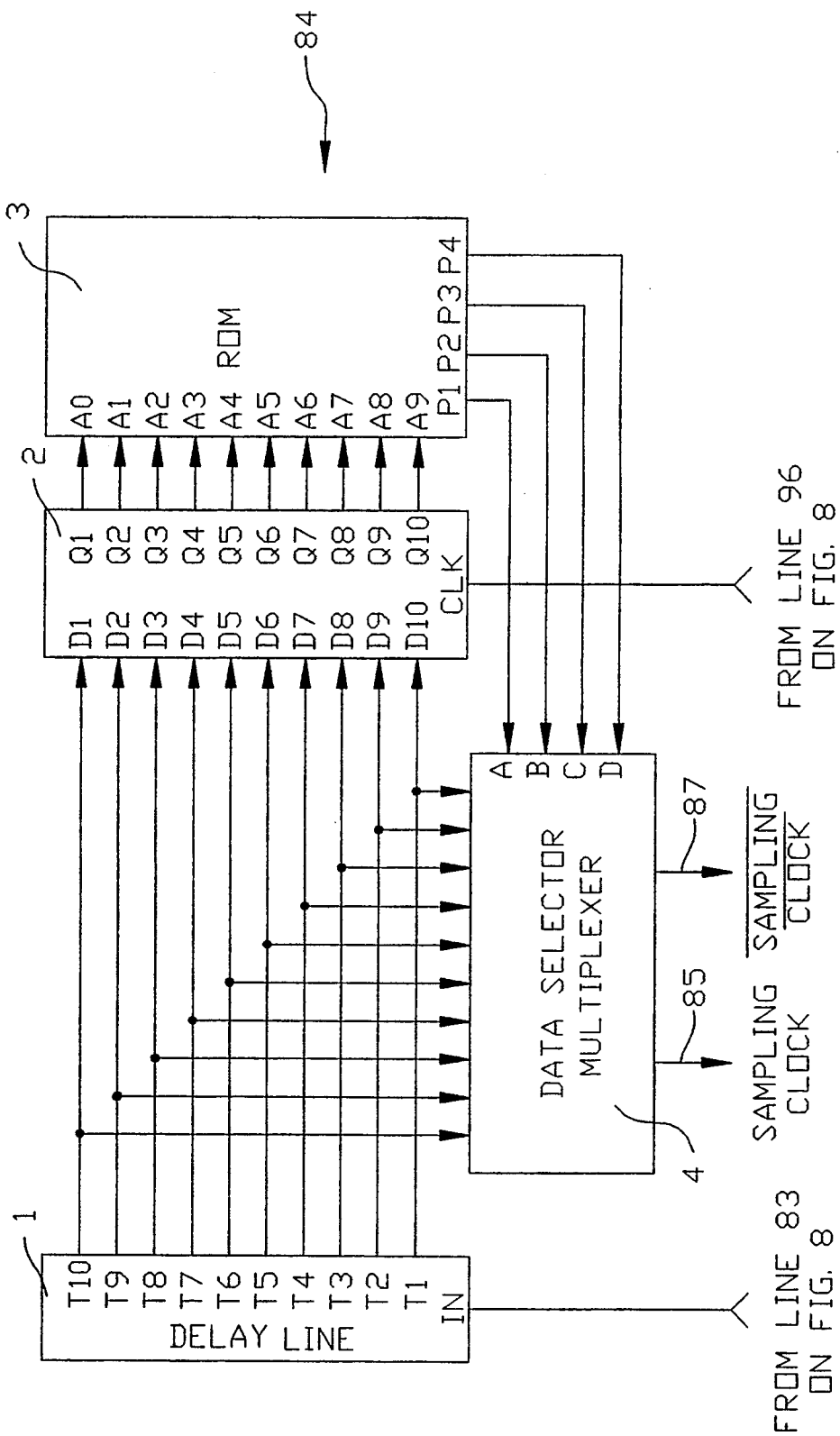
FIG. 9 is a schematic diagram of the preferred 1X asynchronous data sampling clock circuit utilized with the plus-minus UART of the present invention, having the bias distortion circuit removed.

The clock synchronization circuitry for the 1X asynchronous data sampling clock and the received data signal will now be discussed with reference to FIGS. 8 and 9. AND gate 74 is configured to have one input connected to the Q output of flip-flop 94 and the other input connected to the output of threshold detector 56 so that the output of AND gate 74 provides the received data leading edge input to the present 1X asynchronous data sampling clock circuit 84 via line 96.

When receiver network 61 is waiting to receive dam, flip-flop 94 is set so as to enable AND gate 74. Once threshold detector 56 detects the sync bit, the output of gate 74 goes high thereby clocking latch 2 of 1X asynchronous data sampling clock circuit 84, via line 96, as shown in FIG. 9. The twenty nanosecond tap of delay line 66 is connected to one input of NAND gate 98, via line 97, while the other input is connected to the Q output of flip-flop 94. As a result, twenty nanoseconds after threshold detector 56 detects the sync bit, NAND gate 98 will clear flip-flop 94 so as to disable gate 74. As noted above, the QE output of shift register 90 is connected to the clock input of flip-flop 94. As the data word is latched into data latch 86, flip-flop 94 is also clocked so as to re-enable gate 74 for the next data word.

As noted above, utilization of data expansion circuit 60 increases the pulse width of the received data bits. This eliminates the need for the bias distortion circuit discussed above in 1X asynchronous data sampling clock circuit 84 of the present invention. Therefore, the plus-minus UART network can utilized the 1X asynchronous data sampling clock circuit with bias distortion circuitry as shown in FIG. 1 or without bias distortion circuitry as shown in FIG. 9. It should be noted that the function of the common elements of FIGS. 1 and 9 are substantially similar, therefore, the discussion above pertaining to delay line 1, latch 2, ROM 3 and multiplexer 4 of FIG. 1 also pertains to FIG. 9.

To summarize, the operation of 1X asynchronous dam sampling clock of FIG. 9 will now be discussed. The clock on line 83 from flip-flop 82, shown in FIG. 8, is processed through delay line 1 of FIG. 9. As noted above, the sync bit then clocks gate 74 of FIG. 8 so as to clock latch 2 and latch therein the state of the delayed clock outputs of delay line 1. The outputs of latch 2 are connected to the address lines of ROM 3 and the outputs of ROM 3 are connected to the address inputs of multiplexer 4. ROM 3 is programmed to select the delayed clock that corresponds to the center of the expanded odd received data for shift register 78 of FIG. 8. Multiplexer 4 will output a true data sampling clock which corresponds to the expanded odd received data of shift register 78 and an inverse data sampling clock which corresponds to the even received data of shift register 80. In this configuration, the clock for receiver network 61 is synchronized to properly sample the received data, which was initially transmitted at a higher frequency.

While the invention has been particularly shown and described with reference to the preferred embodiments, it will be understood by those skilled in the art that various modifications in form and detail may be made therein without departing from the scope and spirit of the invention. Accordingly, modifications such as those suggested above, but not limited thereto, are to be considered within the scope of the invention.

What is claimed is:

1. An asynchronous transmitter-receiver circuit for use in local area networks, which comprises:
   a transmitter portion having means for separately processing odd data bits and even data bits at a rate between 1 MHz and 40 MHz;
   a receiver portion for processing received data signals and extracting the odd and even data bits therefrom, said receiver portion having a data sampling clock circuit which includes a received data-to-clock position circuit for determining the position of said received data signals with respect to a system clock, a bias distortion circuit for determining the pulse width of the received data signals and means for combining and decoding output signals from said received data-to-clock position circuit and said bias distortion circuit to determine a true center of said received data signals and for selecting a proper sampling clock for said received data signals; and
   an interface portion for serially transmitting said odd and even data bits on a single media in response to said transmitter portion and for receiving serial data from said single media and detecting positive and negative transitions of said received data signals.

2. The transmitter-receiver circuit according to claim 1, wherein said transmitter portion comprises:
   a pair of shift registers configured so that one of said pair of shift registers processes odd data bits and the other of said pair of shift registers processes even data bits; and
   oscillator means for clocking said pair of shift registers, said oscillator means having a center frequency between 1 MHz and 40 MHz.

3. The transmitter-receiver circuit according to claim 2, wherein said oscillator means has a center frequency of b 40 MHz.

4. The transmitter-receiver circuit according to claim 1, wherein said receiver portion further comprises:
   a pair of shift registers configured so that one of said pair of shift registers processes odd data bits and the other of said pair of shift registers processes even data bits in response to said data sampling clock circuit;
   means for latching said processed odd and even data bits; and
   means for synchronizing said data sampling clock circuit with said received data signals.

5. The transmitter-receiver circuit according to claim 4, wherein said receiver portion further comprises pulse expansion means for expanding the pulse width of said odd and even data bits prior to processing by said pair of shift registers.

6. The transmitter-receiver circuit according to claim 1, wherein said interface portion comprises a pulse transformer connected to said transmitter portion, said single media and voltage detecting means for detection said positive and negative transitions of said received data signals.

7. The transmitter-receiver circuit according to claim 1, wherein said data sampling clock circuit comprises:
   a multitapped delay line having an input connected to a clock having a center frequency of approximately one-half the frequency of the processing rate for generating a plurality of delays outputs;
   data latch means for latching at least one of said plurality of delay outputs in response to the detection of said received data signals;
   a Read only Memory (ROM) for determining said proper sampling clock in response to said latched output of said multitapped delay line; and
   a multiplexer for selecting said proper sampling clock from said plurality of delay outputs in response to said Read Only Memory (ROM).

8. A system for asynchronous transmission and reception of data between control units, comprising:
   a first control unit operatively connected to a first asynchronous transmitter-receiver circuit, said first asynchronous transmitter-receiver circuit having a transmitter portion having means for separately processing odd data bits and even data bits at a rate between 1 MHz and 40 MHz; a receiver portion for processing received data signals and extracting the odd and even data bits therefrom, said receiver portion having a data sampling clock circuit which includes a received data-to-clock position circuit for determining the position of said received data signals with respect to a system clock, a bias distortion circuit for determining the pulse width of the received data signals and means for combining and decoding output signals from said received data-to-clock position circuit and said bias distortion circuit to determine a true center of said received data signals and for selecting a proper sampling clock for said received data signals; an interface portion for serially transmitting said odd and even data bits on a single media in response to said transmitter portion and for receiving serial data from said single media and detecting positive and negative transitions of said received data signals;

a second control unit operatively connected to a second asynchronous transmitter-receiver circuit, said second asynchronous transmitter-receiver circuit having a transmitter portion having means for separately processing odd data bits and even data bits at a rate between 1 MHz and 40 MHz; a receiver portion for processing received data signals and extracting the odd and even data bits therefrom, said receiver portion having a data sampling clock circuit which includes a received data-to-clock position circuit for determining the position of said received data signals with respect to a system clock, a bias distortion circuit for determining the pulse width of the received data signals and means for combining and decoding output signals from said received data-to-clock position circuit and said bias distortion circuit to determine a true center of said received data signals and for selecting a proper sampling clock for said received data signals; an interface portion for serially transmitting said odd and even data bits on a single media in response to said transmitter portion and for receiving serial data from said single media and detecting positive and negative transitions of said received data signals; and a further single media connected between said first and second control units, which facilitates serial communication of data therebetween.

* * * * *